United States Patent [19]
Carpenter et al.

[11] 3,807,757
[45] Apr. 30, 1974

[54] FOLDING STEPS FOR CAMPERS AND THE LIKE

[76] Inventors: Harry Carpenter, 159 Willow Ave., Fairfax, Calif. 94930; AC Newport, 4440 Old Redwood Hwy. North, Santa Rosa, both of Calif. 95401

[22] Filed: May 22, 1972

[21] Appl. No.: 255,342

[52] U.S. Cl............................ 280/166, 182/95
[51] Int. Cl............................. B60r 3/02
[58] Field of Search........ 280/166, 163; 182/95, 96, 182/156

[56] References Cited
UNITED STATES PATENTS
3,067,835  12/1962  Valley............................ 182/95
3,330,577  7/1967  Mills............................. 280/166
3,394,947  7/1967  Strube............................ 280/166

Primary Examiner—Robert R. Song
Attorney, Agent, or Firm—Gordon Wood

[57] ABSTRACT

Folding step structure particularly adapted for use on campers, trucks and other vehicles. The steps are stored in a vertical position on the rear bumper and are adapted to fold downwardly when in use. Advantage is taken of the rear bumper construction to support the upper first step and for swingably supporting the second step. The construction permits the use of a third lowermost step if desired.

5 Claims, 4 Drawing Figures

PATENTED APR 30 1974 3,807,757

FOLDING STEPS FOR CAMPERS AND THE LIKE

This invention relates to a step construction particularly adapted for use at the rear end of vehicles such as campers and trucks so that the steps may be folded to an upper stored position when not in use and readily folded to a lower position when ready for use.

The main object of the present invention is generally to improve step constructions of the subject type and to provide economical and efficient step structure to permit the user to gain entrance to the rear of the camper or truck or other vehicle to which the structure is attached.

Another object of the invention is the provision of a novel step construction which takes advantage of the presence of the typical Barden bumper type of construction which is commonplace in many trucks and campers. By the present invention, a simple, inexpensive structure is employed which may be readily secured to such conventional bumpers.

Still another object of the invention is the provision of a step construction which lends itself to use with either two steps or three steps depending upon the height of the bumper and further depending upon the agility of the user.

Other objects and advantages will be apparent from the following specification and from the drawings.

Figure 1:
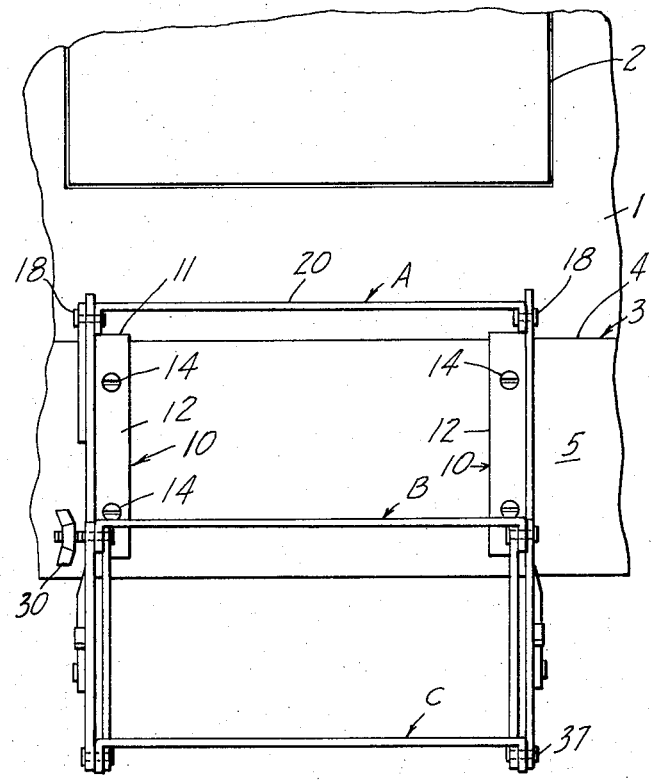
FIG. 1 is a fragmentary rear elevation of the rear end of the vehicles such as a camper, showing the invention secured thereto in its operative position.

First with reference to FIG. 1, the invention is adapted to be employed on the rear end of a vehicle, such as a camper, which includes an end wall 1, a door frame 2, and a rearwardly projecting bumper generally designated 3. In the particular form shown in the drawings the bumper 3 includes an upper horizontally disposed portion 4, an integral vertically disposed portion 5 and a lower flange or bottom indicated at 6.

In the drawings an upper step is indicated at A, an intermediate step at B, and a lower step at C. As will subsequently be seen, the lower step C may be dispensed with or may be swung to a stored position when it is not desired to use the same. In such a case, only steps A and B may be utilized.

Figure 2:
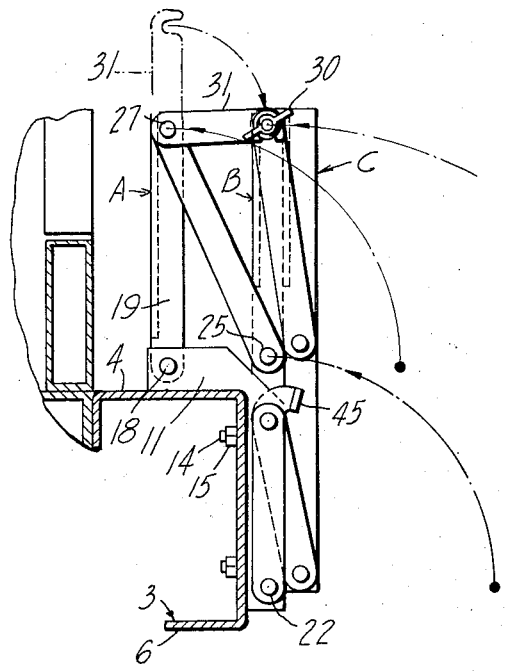
FIG. 2 is a side elevation of the structure of FIG. 1 showing the steps in their upper stored position.

The step structure may be conveniently mounted on the bumper 3 by means of a pair of angle bar clips 10, each of which is formed to provide upper horizontally extending portions 11 and vertically extending portions 12. As best seen in FIG. 2 the vertically extending portions 12 may be fixedly secured to the bumper 3 by means of bolts 14 and nuts 15. The inner ends of horizontal portions 11 of clips 10 are formed to provide pivots 18 by which the upper step A is swingably secured to said clips.

The steps A, B, C are similar in construction and each includes a pair of end members 19 connected together by means of a tread 20. If desired, the end members 19 may be formed of angle bar and such angle bar may extend across the outer side of each step to form a generally U-shaped frame. At this point it will be seen that the upper step A may be swung from the vertically disposed position shown in FIG. 2 to the horizontal position shown in FIG. 3. In the latter position, it will be seen that the horizontal leg of upper portion 11 of the clip 10 acts as an abutment against which the lower edge of end member 19 rests so that the remaining outer portion of step A projects horizontally outwardly from the bumper 3.

Adjacent the lower ends of the vertically extending portions 12 of clips 10, the same are provided with pivots 22 which serve to swingably support the inner end of the second step B, which of course is considerably wider than the upper step A. However, the tread portion of step B need not be any wider than the corresponding tread portion of step A. At a point intermediate the inner end and outer sides of tread B, the end members 24 thereof are provided with pivots 25 to which are pivotally secured the lower ends of links 26 which, at their upper ends, are swingably secured to pivots 27 adjacent the outer ends of step A. At this point it will be seen that steps A and B are very rigidly secured together as well as being secured firmly to the bumper 3.

At the outer end of step B and secured to one of the end members 24 is a wing nut 30 which, when the structure is folded to its stored position as seen in FIG. 2, is adapted to engage the free end of a locking bar 31 so that upon tightening wing nut 30 the entire structure can be fixedly secured in the upper stored position of FIG. 2.

Figure 3:
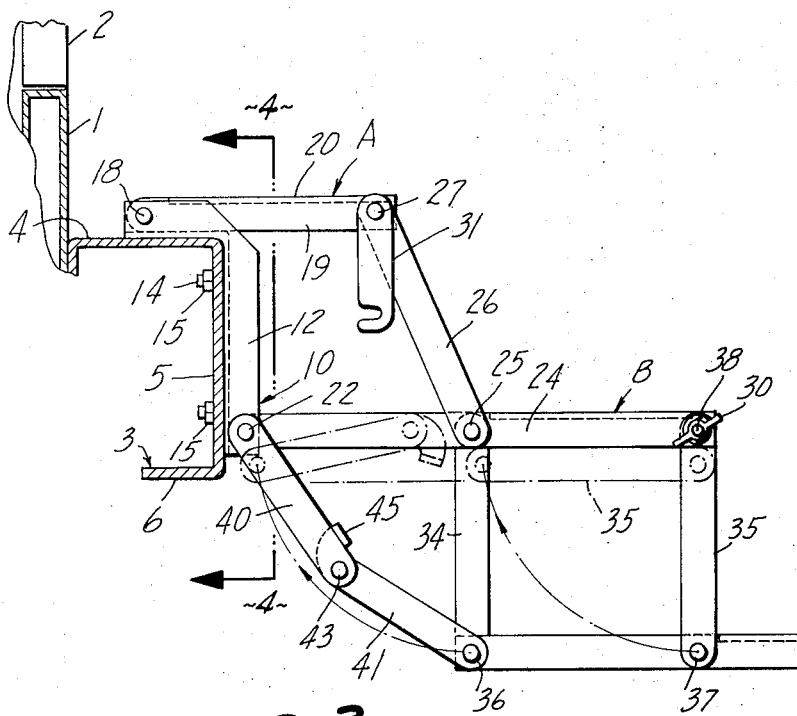
FIG. 3 is the view similar to FIG. 2 but with the steps in their lowered operative position.
Figure 4:
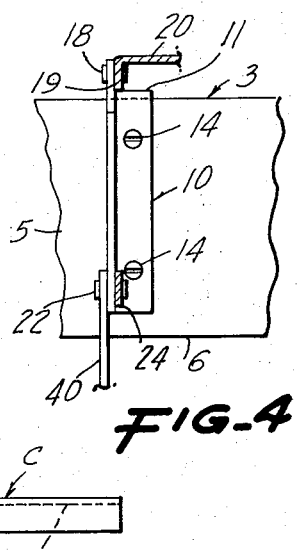
FIG. 4 is a fragmentary end elevation view of the vehicle bumper showing the securement of the step structure thereto.

The present invention lends itself to a structure incorporating three steps. In many cases, the elevation of the bumper is such that the normal agile person can make the large first step required to step on tread B. However, in many instances, a user having a physical infirmity requires an additional step such as the lower step C. In this case, the lower step C which is similar in structure to step B is swingably secured by means of a pair of links 34, 35 which are pivotally connected to lower step C at pivots 36, 37 respectively. Link 34 may be swingably secured at its upper end to pivot 25 on step B and a similar pivot 38 may be provided adjacent the outer step B and which pivot also serves as a support for the previously described wing nut 30. In order to maintain the lower step C in a stable condition, a locking linkage is provided comprising an upper link 40 and a lower link 41 (FIG. 3). Upper link 40 may be pivotally supported on pivot 22 at one end and secured by a pivot 43 to the adjacent end of lower link 41, which in turn is pivoted at its opposite end to the pivot 36. From FIG. 3 it will be seen that the lower step C is in an extremely stable condition because of the fact that locking links 40, 41 have moved past an intermediate position in which they are in alignment. In order to maintain the locking links 40, 41 in said intermediate position, an extension 45 is provided on lower link 41 and which extension, in the position of FIG. 3, bears against the upper edge of link 40. It will be understood when it is desired to swing the structure from the operative position of FIG. 3 to the stored position of FIG. 2 that it is necessary to manually move the pivot 43 to the right and upwardly as seen in FIG. 3 in order to get it past dead center. Thereafter, the links 40, 41 may be swung into closely adjoining relationship as seen in FIG. 2. If it is desired not to employ the bottom step C, the same may be swung upwardly into a position underlying the step B as indicated in dotted lines in FIG. 3.

It will be seen that the above described step structure is extremely rugged and dependable in use, is devoid of unnecessary complications, and may be readily swung to the upper stored position when the same is not in use.

We claim:

1. A step assembly comprising:
   a top support having an upwardly facing upper surface,
   a first step,
   a pivot on said top support spaced upwardly from said upper surface for swingably supporting the inner side of said first step,
   means on said top support forming an upwardly facing abutment for engaging the under side of said first step at a point intermediate the inner and outer sides of said first step when the latter is horizontal,
   a second step,
   means fixed relative to said top support and spaced downwardly from said abutment for providing a second pivot for said second step, and
   a connecting link between said first step and said second step for supporting the latter in a horizontal position when said first step is horizontal.

2. A step assembly according to claim 1 wherein a third step is positioned below said second step, a lower pair of links swingably connecting said second and third steps.

3. A step assembly according to claim 1 wherein said connecting link is spaced outwardly of said second pivot to permit said steps to be swung to substantially vertically extending positions.

4. A step assembly according to claim 3 wherein a connecting member extends between said first and second steps for holding said steps in a vertically disposed stored position.

5. A step assembly according to claim 2 wherein locking means is provided for holding said third step in a fixed horizontal position relative to said second step.

* * * * *